United States Patent
Di Censo et al.

(10) Patent No.: US 9,795,015 B2
(45) Date of Patent: Oct. 17, 2017

(54) AUTOMATIC IDENTIFICATION AND LOCALIZATION OF WIRELESS LIGHT EMITTING ELEMENTS

(71) Applicant: Harman International Industries, Incorporated, Stamford, CT (US)

(72) Inventors: Davide Di Censo, Oakland, CA (US); Stefan Marti, Oakland, CA (US); Kevin Hague, San Jose, CA (US); Jaime Elliot Nahman, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/174,793

(22) Filed: Jun. 6, 2016

(65) Prior Publication Data

US 2016/0366752 A1    Dec. 15, 2016

Related U.S. Application Data

(60) Provisional application No. 62/174,469, filed on Jun. 11, 2015.

(51) Int. Cl.
*H05B 37/02* (2006.01)

(52) U.S. Cl.
CPC ....... *H05B 37/0272* (2013.01); *H05B 37/029* (2013.01); *H05B 37/0227* (2013.01)

(58) Field of Classification Search
CPC ............ H05B 37/0272; H05B 37/0227; H05B 37/0281
See application file for complete search history.

(56) References Cited

U.S. PATENT DOCUMENTS

2009/0051624 A1* 2/2009 Finney ............... H05B 37/0245
345/30
2009/0146982 A1* 6/2009 Thielman ................. H04N 7/15
345/207

(Continued)

FOREIGN PATENT DOCUMENTS

EP         2315503 A2     4/2011
WO    2014108784 A2     7/2014

OTHER PUBLICATIONS

Extended European Search Report for Application No. 16 17 3796, dated Oct. 7, 2016, 3 pages.

*Primary Examiner* — Don Le
(74) *Attorney, Agent, or Firm* — Artegis Law Group, LLP (57) ABSTRACT

One or more embodiments set forth techniques for identifying and locating wireless light emitting elements within a lighting system. An identification and location module executing on calibration system transmits a message to instruct a first light emitting element included in a plurality of light emitting elements within the lighting system to emit light having a first characteristic. The identification and location module detects, via a photosensitive device, a first location of the first light emitting element within the lighting system based on the first characteristic. The identification and location module stores a data entry in a memory that associates the first location with the first light emitting element. At least one advantage of the approach described herein is that wireless light emitting elements are automatically identified and located during post assembly testing, thereby reducing labor costs associated with manually pre-sorting or recording IDs of the light emitting elements.

18 Claims, 7 Drawing Sheets

(56) References Cited

U.S. PATENT DOCUMENTS

| | | | |
|---|---|---|---|
| 2015/0319827 A1* | 11/2015 | Lee .................... | H05B 37/0227 |
| | | | 315/152 |
| 2016/0135271 A1* | 5/2016 | Alexander ......... | H05B 33/0857 |
| | | | 315/297 |
| 2016/0212831 A1* | 7/2016 | Dobai ................ | H05B 37/0281 |

* cited by examiner

AUTOMATIC IDENTIFICATION AND LOCALIZATION OF WIRELESS LIGHT EMITTING ELEMENTS

CROSS-REFERENCE TO RELATED APPLICATIONS

This application claims the benefit of U.S. provisional patent application titled, "AUTOMATIC IDENTIFICATION AND LOCALIZATION OF WIRELESS LIGHT EMITTING ELEMENTS," filed on Jun. 11, 2015 and having Ser. No. 62/174,469. The subject matter of this related application is hereby incorporated herein by reference.

BACKGROUND

Field of the Various Embodiments

Embodiments of the present disclosure relate generally to assemblies that include light emitting elements and, more specifically, to techniques for automatically identifying and localizing wireless light emitting elements.

Description of the Related Art

Whether at live concerts, at parties, or at home, the experience of listening to music is often enhanced when accompanied by a display of colored lights in shifting patterns. Such displays of colored lights are typically referred to as light shows. The physical structures housing the colored lights used in light shows typically include a lighting system with a lighting substrate composed of a rigid or flexible material, on or in which the multiple individual light emitting elements are either mounted or embedded. The lighting substrate may be composed of an acoustically transparent or translucent material, where sound waves transmitted by the loudspeaker are able to pass through the lighting substrate with relatively low attenuation. In such cases, the lighting substrate may be placed in front of a loudspeaker. Each of the light emitting elements is wired, via a wiring harness, to a particular location on a controller. The controller individually controls the color and intensity of each mounted light emitting element to generate various shifting patterns. The controller produces various lighting effects by controlling and synchronizing the timing of color and intensity changes by transmitting signals to each of the individual light emitting elements via the wiring harness.

One drawback of having wired light emitting elements is that the material and labor costs for wiring each individual light emitting element to the controller can be significant relative to the cost of the overall lighting system. For example, the material and labor costs include the cost of the wire harness between each of the light emitting elements and the controller and the costs to place and route each wire harness between a particular light emitting element and a particular corresponding location on the controller. Another drawback of having wired light emitting elements is that the wiring harnesses provide an acoustic barrier that can prevent sound waves from efficiently passing through areas of the lighting substrate covered by the wiring harnesses. In applications where the lighting system is placed in front of one or more speakers, the wiring harnesses may attenuate or reflect sound waves transmitted by the speakers, thereby decreasing the effective volume of the speakers.

One possible solution to the above problems is to place wireless light emitting elements on the lighting substrate. Wireless light emitting elements are configured to receive control information and power wirelessly, thereby removing the need for a wire harness. In such an implementation, each wireless light emitting element is associated with a different identifier (ID). To generate different shifting light patterns, the controller controls the timing of the color and intensity for each light emitting element by transmitting control messages to the different light emitting elements. Each of those control messages identifies a particular target light emitting element via the ID.

One drawback of the above solution is that the IDs for the individual light emitting elements are usually unknown before the lighting substrate is assembled into the lighting system. In fact, during assembly, a machine typically picks the light emitting elements randomly from a pool of available light emitting elements, without regard to the IDs of the selected light emitting elements, and places the light emitting elements onto or embeds the light emitting elements into the lighting substrate. Consequently, during or after the lighting system is assembled, the ID of each light emitting element has to be manually recorded along with the corresponding position of each light emitting element on the lighting substrate. The resulting mapping between light emitting element IDs and corresponding positions is then manually programmed into the controller. The manual process of recording the mapping and programming the mapping into the controller can be labor intensive and error prone. Further, if one or more light emitting elements included in a given lighting system need to be replaced during operation, the same manual techniques described above must be followed, thereby increasing overall maintenance costs.

As the foregoing illustrates, more effective ways for identifying and localizing wireless light emitting elements included in lighting systems would be useful.

SUMMARY

Embodiments of the present disclosure provide a computer-implemented method for identifying and locating wireless light emitting elements within a lighting system. The method includes transmitting a message to instruct a first light emitting element included in a plurality of light emitting elements within the lighting system to emit light having a first characteristic. The method further includes detecting, via a photosensitive device, a first location of the first light emitting element within the lighting system based on the first characteristic. The method further includes storing a data entry in a memory that associates the first location with the first light emitting element.

Other embodiments include, without limitation, a computer readable medium including instructions for performing one or more aspects of the disclosed techniques, as well as a computing device for performing one or more aspects of the disclosed techniques.

At least one advantage of the approach described herein is that wireless light emitting elements are automatically identified and located during post assembly testing, thereby reducing labor costs associated with manually presorting or recording IDs of the light emitting elements. The reduction in labor costs may result in lower total product cost and/or an increase in the quantity of wireless light emitting elements that may be deployed for a given target product cost.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

Among other things, the embodiments described herein pertain to programmatic techniques for mapping a group of wireless light emitting elements within a lighting system by identifying and localizing the light emitting elements visually via a calibration system. Various embodiments relate to calibration systems where light emitting elements are arranged on or in a lighting substrate in a random or unknown way (e.g., due to production methods) and need to be identified and localized automatically during a calibration procedure performed during the manufacturing process. Various embodiments also relate to implementations that include multiple self-powered or wirelessly-powered light emitting elements with wireless communication capabilities. These light emitting elements may be arranged in any one-dimensional (1D), two-dimensional (2D), or three-dimensional (3D) spatial configuration, and their respective locations are either random or unknown prior to the calibration process.

The 1D, 2D, or 3D spatial configuration of the light emitting elements may be low resolution, having a relative small number of light emitting elements, or high resolution, having a larger number of light emitting elements. In either case, the light emitting elements are arranged to provide a particular visual display. In order to create the intended visual appearance, the location of each light emitting element, relative to other light emitting elements, is determined and associated with a unique ID corresponding to the light emitting element.

In order to simplify the manufacturing process, the light emitting elements may be placed on or embedded in a lighting substrate in such a way that the location of a specific light emitting element is not known during the placement process. For example, and without limitation, a machine could pick and place the light emitting elements on or in a lighting substrate without being aware of the IDs of the light emitting elements. As a result, the exact position of each light emitting element is not known after the lighting system is assembled. Via the disclosed techniques, the location and corresponding identity of each light emitting element is determined automatically and stored in a database. With this information, the individual light emitting elements may be addressed in a meaningful way in order to generate an overall visual experience that gives the appearance of a visual display. For example, and without limitation, if the light emitting elements are arranged on or in the lighting substrate in a 2D grid pattern, then the overall visual experience could be to display any desired visual image via the lighting system, similar to visual images available via other pixel-based display technologies, such as LCD and LED displays.

System Overview

Figure 1:
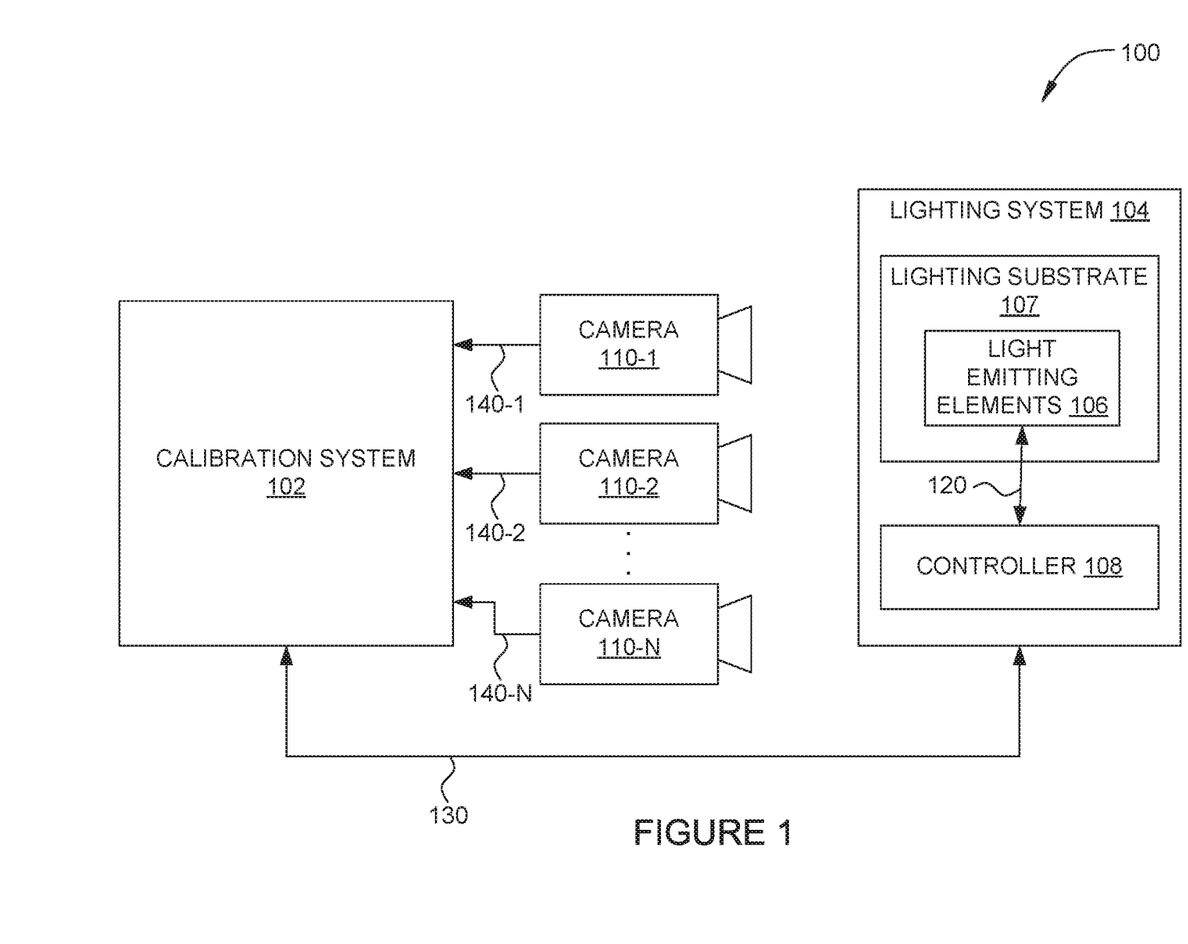
FIG. 1 illustrates a system configured to implement one or more aspects of the various embodiments.

FIG. 1 illustrates a system 100 configured to implement one or more aspects of the various embodiments. As shown, system 100 includes, without limitation, a lighting system 104, a calibration system 102, and one or more cameras 110-1, 110-2, . . . 110-N.

Lighting system 104 includes, without limitation, a lighting substrate 107 and a controller 108. In various embodiments, lighting substrate 107 may be any rigid or flexible structure that includes one or more wireless light emitting elements 106 for visual display or effect and arranged in any configuration, as set forth in greater detail herein. In some embodiments, light emitting elements 106 are embedded into a lighting substrate 107 made of a flexible material such as cloth. Lighting substrate 107 may be constructed to fit around a surface of any arbitrary shape, including, without limitation, a cube, a rectangular solid, and a cylinder. Alternatively, lighting substrate 107 may include one or more cords or chains, where light emitting elements are distributed along the cords or chains. Lighting substrate 107 may be constructed from an acoustically transparent or translucent material where sound waves transmitted by the loudspeaker are able to pass through lighting substrate 107 with relatively low attenuation.

Lighting substrate 107, in turn, is fitted with any technically feasible number of light emitting elements 106. Light emitting elements 106 may employ any technically feasible lighting technology, including, without limitation, light emitting diodes (LEDs), backlit liquid crystal displays (LCDs), or incandescent lights. Light emitting elements 106 may emit any form of light, including, without limitation, visible light, infrared light, and ultraviolet light. Light emitting elements 106 may be configured to emit light of a single color or frequency, or, in the alternative, at a variably adjustable color or frequency. Light emitting elements 106 include a wireless communication capability and may be arranged on or within the lighting substrate 107 within lighting system 104 in any technically feasible configuration.

Light emitting elements 106 are wirelessly addressable via any technically feasible communications technique, including, without limitation, radio frequency (RF), infrared (IR), ultrasound, ultraviolet (UV), electric field, and radio frequency identification (RFID) technologies. In various embodiments, light emitting elements 106 may be self-powered via any technically feasible technique, including, without limitation, miniaturized batteries and super capacitor technologies. In various embodiments, light emitting elements 106 may be wirelessly powered via any technically feasible technique, including, without limitation, light harvesting, temperature difference, vibration, acoustic energy, radio field, magnetic field, and electric field technologies. In addition, in various embodiments, light emitting elements 106 may include sensing capabilities, including, without limitation, electric field sensing and RF sensing technologies.

In operation, controller 108 communicates with light emitting elements 106 over a wireless communications channel 120. Controller 108 transmits messages to light emitting elements 106 to control the color, intensity, and timing of the light emitted by each of the light emitting elements 106. In addition, controller 108 exchanges various control and initialization messages with light emitting elements 106. For example, and without limitation, controller 108 could transmit a message instructing all light emitting elements 106 to return an identification message. In response, each of the light emitting elements 106 could return a message that includes the ID of the particular light emitting element 106. Further, controller 108 communicates with calibration system 102 via communications channel 130. Communications channel 130 may be any technically feasible wired or wireless communications channel.

In operation, calibration system 102 is configured to implement one or more of the techniques set forth herein, to identify and localize light emitting elements 106. In various embodiments, when implementing these techniques, calibration system 102 may communicate with controller 108 included within lighting system 104 via communications channel 130. Alternatively, or in addition, calibration system 102 may communicate directly with and directly control light emitting elements 106 via a wireless communications channel (not explicitly shown). In some embodiments, calibration system 102 may include a controller similar to controller 108 illustrated in FIG. 1, where the controller 108 is configured to communicate directly with and directly control light emitting elements 106 via a wireless communications channel. Calibration system 102 receives images from one or more cameras 110-1, 110-2, . . . 110-N via communications channels 140-1, 140-2, . . . 140-N, respectively. Communications channels 140-1, 140-2, . . . 140-N may be any technically feasible wired or wireless communications channels, in any combination.

During manufacturing, light emitting elements 106 are placed onto lighting substrate 107 in a particular physical arrangement, such as a grid pattern, but without regard to the IDs of light emitting elements 106. In various embodiments, light emitting elements 106 may be placed onto lighting substrate 107 either manually or via an automated process. Then, lighting substrate 107 is affixed to one or more surfaces of lighting system 104. Lighting system 104 is then placed in a particular orientation with respect to cameras 110-1, 110-2, . . . 110-N. In general, the number of cameras 110 is selected based on the physical arrangement of light emitting elements 106, such that each light emitting element 106 is viewable by at least one of cameras 110-1, 110-2, . . . 110-N. In some embodiments, if light emitting elements 106 are arranged onto a planar surface, then one camera directed to the planar surface may be sufficient to determine the location of all light emitting elements 106. In other embodiments, if light emitting elements 106 are arranged onto a cylindrical surface, then two or three cameras directed to different portions of the cylindrical surface may be needed to determine the location of all light emitting elements 106. Lighting system 104 is placed in a predefined manner to have a fixed orientation with respect to each of cameras 110-1, 110-2, . . . 110-N. As an alternative, one camera 110-1 may be deployed, and lighting system 104 may be rotated and/or articulated in a predefined way until camera 110-1 has viewed, identified, and located all of the light emitting elements 106.

In various embodiments, various photosensitive devices other than cameras may be deployed as an alternative to, or in addition to, cameras 110-1, 110-2, . . . 110-N. Such photosensitive devices may include, without limitation photosensors, photo resistors, photo diodes, and photocells.

To identify and localize light emitting elements 106, calibration system 102 first transmits a message to controller 108 instructing that IDs for all light emitting elements 106 be returned. After receiving the IDs for all light emitting elements 106, calibration system 102 then transmits a message to controller 108 to cause one or more light emitting elements 106, with specified IDs, to emit light at a particular color and intensity and/or with a particular timing pattern. Calibration system 102 receives images from one or more cameras 110-1, 110-2, . . . 110-N. Calibration system 102 analyzes the images to detect light at the specified colors, intensities, and/or timing patterns. Based on the images and on the location of lighting system 104 relative to each of cameras 110-1, 110-2, . . . 110-N, calibration system 102 determines the location of each light emitting element 106 that is emitting light as specified. Calibration system 102 associates the location of each light emitting element 106 with the corresponding ID and stores the associations as a data entry in a database. Calibration system 102 repeats this process until locations are identified for all light emitting elements 106. Calibration system 102 then transmits the database to controller 108 so that controller 108 has a mapping of the location of each light emitting element 106 along with the ID for the particular light emitting element 106.

In one example, and without limitation, calibration system 102 could transmit a message instructing one light emitting element 106 with a specified ID to emit light. Based on the images from each of cameras 110-1, 110-2, . . . 110-N and on the location of lighting system 104 relative to cameras 110-1, 110-2, . . . 110-N, calibration system 102 determines the location of the light emitting element 106. Calibration system 102 associates the location with the specified ID of the light emitting element 106 and stores the association as a data entry in a database. Calibration system 102 repeats this process until the location and ID for each light emitting element 106 is determined.

In another example, and without limitation, calibration system 102 transmits a message instructing one or more light emitting elements 106 with specified IDs to emit light with different lighting characteristics. The lighting characteristics could include, without limitation, color value, intensity value, and timing, in any technically feasible combination. If one of the lighting characteristics is color value, then calibration system 102 would transmit a message to instruct that each of light emitting elements 106 with specified IDs emit light with different colors. If one of the lighting characteristics is intensity value, then calibration system 102 would transmit a message to instruct that each of light emitting elements 106 with specified IDs emit light with different intensity, or brightness.

If one of the lighting characteristics is timing, then calibration system 102 would transmit a message to instruct that each of light emitting elements 106 with specified IDs emit light with different timing patterns. In such cases, calibration system 102 could instruct that each of light emitting elements 106 with specified IDs emit light with different duty cycles and/or different strobe frequencies.

Alternatively, calibration system 102 could instruct that each of light emitting elements 106 with specified IDs emit light with different encoded and modulated data, where the data could be the ID for the corresponding light emitting device 106. The message could be encoded via any technically feasible approach, including, without limitation, pulse-code modulation (PCM), quadrature amplitude modulation (QAM), and pulse width modulation (PWM). Based on the images from each of cameras 110-1, 110-2, . . . 110-N and on the location of lighting system 104 relative to cameras 110-1, 110-2, . . . 110-N, calibration system 102 determines the location of the light emitting elements 106 emitting light with different lighting characteristics. Calibration system 102 associates the locations with the specified IDs of the light emitting element 106s and stores the associations as data entries in a database. Calibration system 102 repeats this process until the location and ID for each light emitting element 106 is determined.

Figure 2:
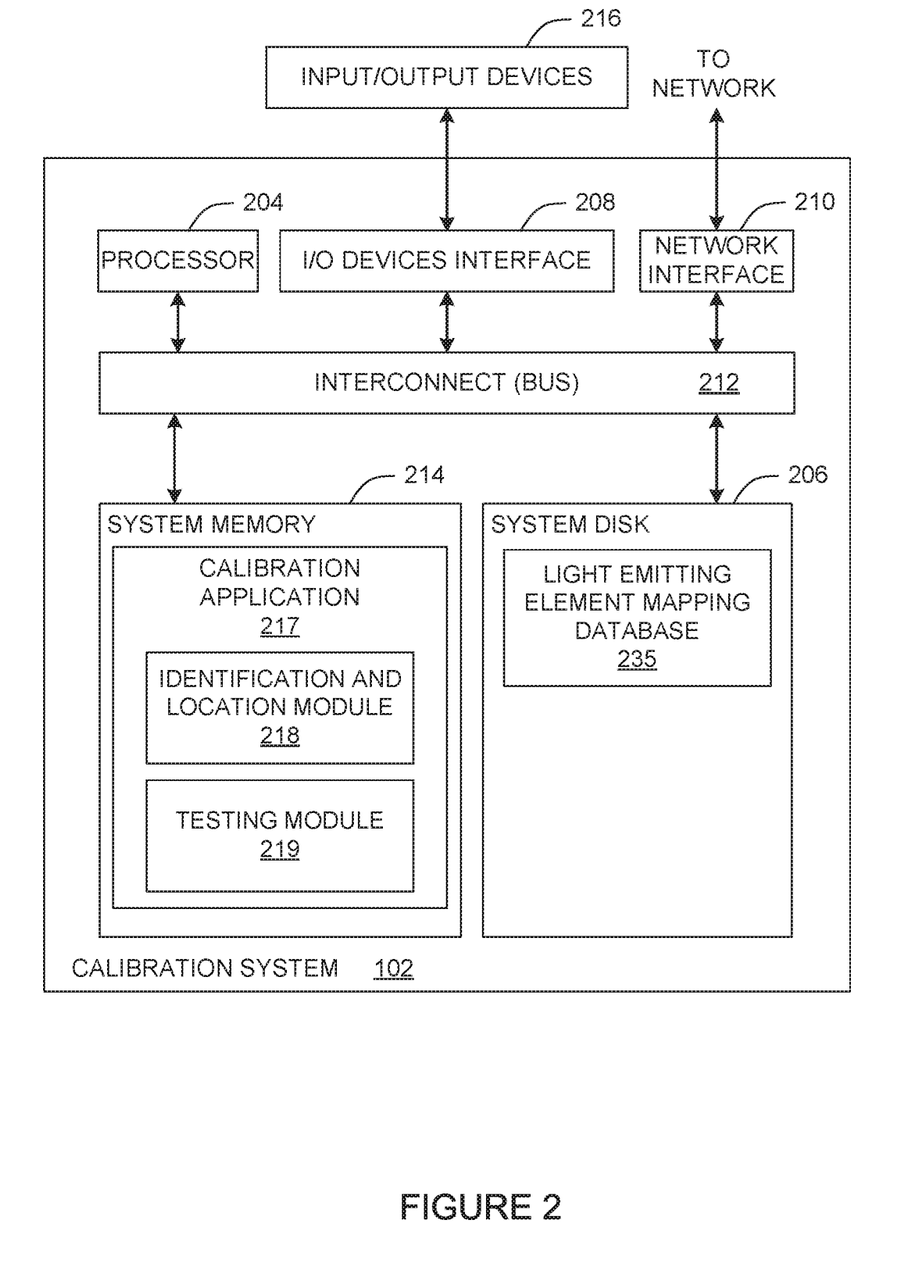
FIG. 2 is a more detailed block diagram of the calibration system of FIG. 1, according to various embodiments.

FIG. 2 is a more detailed block diagram of the calibration system 102 of FIG. 1, according to various embodiments. As shown, calibration system 102 includes, without limitation, a processor 204, a system disk 206, an input/output (I/O) devices interface 208, a network interface 210, an interconnect 212, and a system memory 214. In various implementations, calibration system 102 may include a server machine, personal computer, laptop computer, tablet computer, personal digital assistant, mobile phone, mobile device or any other device suitable for practicing one or more of the contemplated embodiments.

Processor 204 may be any technically feasible form of processing device configured process data and execute program code. Processor 204 could be, for example and without limitation, a central processing unit (CPU), a digital signal processor (DSP), a graphics processing unit (GPU), an application-specific integrated circuit (ASIC), a field-programmable gate array (FPGA), and so forth. Processor 204 includes one or more processing cores. In operation, processor 204 is the master processor of calibration system 102, controlling and coordinating operations of other system components. System memory 214 stores software applications and data for use by processor 204. Processor 204 executes software applications stored within system memory 214 and optionally an operating system. In particular, processor 204 executes software and then performs one or more of the functions and operations set forth in the present application.

Similarly, processor 204 is configured to store application data (e.g., software libraries) and retrieve application data from system memory 214. Interconnect 212 is configured to facilitate transmission of data, such as programming instructions and application data, between processor 204, system disk 206, I/O devices interface 208, network interface 210, and system memory 214. I/O devices interface 208 is configured to receive input data from I/O devices 216 and transmit the input data to processor 204 via interconnect 212. I/O devices interface 208 is further configured to receive output data from processor 204 via interconnect 212 and transmit the output data to I/O devices 216. For example, and without limitation, I/O devices 216 may include one or more microphones, one or more speakers, one or more audio signals from a media system, a keyboard, a mouse, and/or other input and output devices.

System memory 214 includes, without limitation, a calibration application 217 that, in turn, includes an identification and location module 218 and a testing module 219. In operation, identification and location module 218 transmits instructions, in the form of messages, to identify and locate light emitting elements 106 of lighting system 104 via one or more of the techniques described herein. Identification and location module 218 associates the ID of each light emitting element 106 with a corresponding location and stores the associations as data entries in a light emitting element mapping database 235. Identification and location module 218 then transmits light emitting element mapping database 235 to controller 108 of lighting system 104. In operation, testing module 219 tests and verifies the location and identity of light emitting elements 106. Testing module 219 transmits instructions, in the form of messages, to controller 108 of lighting system 104 to cause one or more light emitting elements 106 to emit light with various lighting characteristics including, without limitation, color value, intensity value, and timing. Testing module 219 verifies that the location of each light emitting element 106 matches the location determined by identification and location module 218.

System disk 206 may include one or more hard disk drives, solid state storage devices, or similar storage devices. System disk 206 is configured to store non-volatile data such as light emitting element mapping database 235. Light emitting element mapping database 235 stores associations between IDs and location for each light emitting element 106, as further described herein. In some embodiments, network interface 210 may be configured to operate in compliance with the Ethernet standard.

Figure 3:
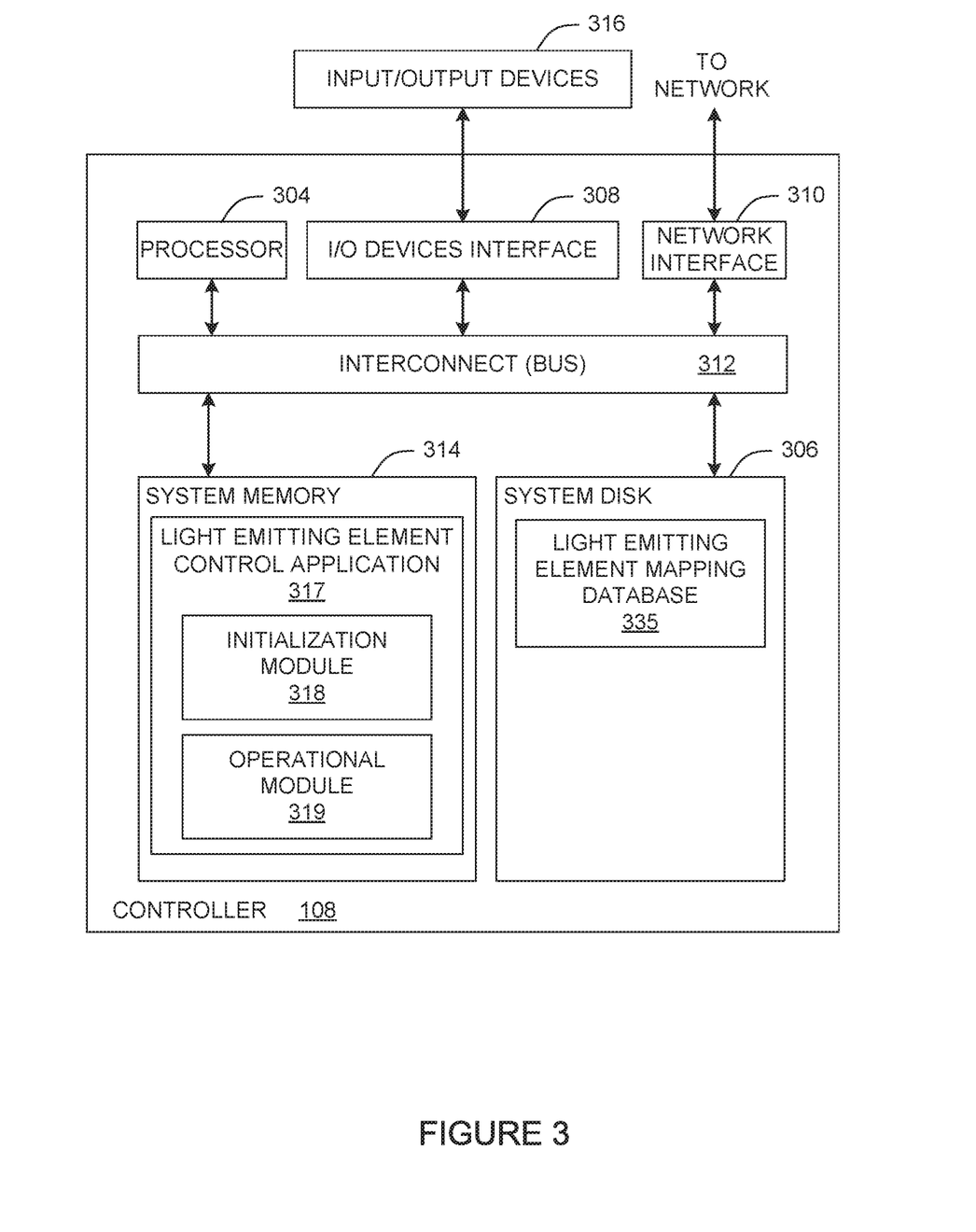
FIG. 3 is a more detailed block diagram of the controller of FIG. 1, according to various embodiments.

FIG. 3 is a more detailed block diagram of the controller 108 of FIG. 1, according to various embodiments. As shown, controller 108 includes, without limitation, a processor 304, a system disk 306, an input/output (I/O) devices interface 308, a network interface 310, an interconnect 312, and a system memory 314. In various implementations, controller 108 may include a server machine, personal computer, laptop computer, tablet computer, personal digital assistant, mobile phone, mobile device or any other device suitable for practicing one or more of the contemplated embodiments.

Processor 304 may be any technically feasible form of processing device configured process data and execute program code. Processor 304 could be, for example and without limitation, a central processing unit (CPU), a digital signal processor (DSP), a graphics processing unit (GPU), an application-specific integrated circuit (ASIC), a field-programmable gate array (FPGA), and so forth. Processor 304 includes one or more processing cores. In operation, processor 304 is the master processor of controller 108, controlling and coordinating operations of other system components. System memory 314 stores software applications and data for use by processor 304. Processor 304 executes software applications stored within system memory 314 and optionally an operating system. In particular, processor 304 executes software and then performs one or more of the functions and operations set forth in the present application.

Similarly, processor 304 is configured to store application data (e.g., software libraries) and retrieve application data from system memory 314. Interconnect 312 is configured to facilitate transmission of data, such as programming instructions and application data, between processor 304, system disk 306, I/O devices interface 308, network interface 310, and system memory 314. I/O devices interface 308 is configured to receive input data from I/O devices 316 and transmit the input data to processor 304 via interconnect 312. I/O devices interface 308 is further configured to receive output data from processor 304 via interconnect 312 and transmit the output data to I/O devices 316. For example, and without limitation, I/O devices 316 may include one or more microphones, one or more speakers, one or more audio signals from a media system, a keyboard, a mouse, and/or other input and output devices.

System memory 314 includes, without limitation, a light emitting element control application 317 that, in turn, includes an initialization module 318 and an operational module 319. In operation, initialization module 318 receives instructions, typically in the form of messages, from identification and location module 218 and testing module 219 of calibration application 217. Initialization module 318 first receives an instruction from identification and location module 218 to return IDs for all light emitting elements 106. Initialization module 318 causes each light emitting element 106 to transmit a message that includes the respective ID for light emitting element 106. After initialization module 318 receives IDs from all light emitting elements 106, initialization module 318 transmits the set of IDs to identification and location module 218.

Initialization module 318 receives a message from identification and location module 218 instructing that a first set of one or more light emitting elements 106 with specified IDs emit light with certain lighting characteristics, such as color value, intensity value, or timing characteristics. Initialization module 318 causes the first set of light emitting elements 106 to emit light with the specified characteristics. After identification and location module 218 has identified the location of the first set of light emitting elements 106, initialization module 318 receives a message from identification and location module 218 instructing that a second set of one or more light emitting elements 106 with specified IDs emit light with certain lighting characteristics. Initialization module 318 causes the first set of light emitting elements 106 to stop emitting light. Initialization module 318 then causes the second set of light emitting elements 106 to emit light with the specified characteristics. The process continues until identification and location module 218 has identified the location of all light emitting elements 106 represented in the list of IDs. Initialization module 318 then receives a copy of light emitting element mapping database 235 from identification and location module 218 and stores the copy into light emitting element mapping database 335.

Initialization module 318 then receives a message from identification and location module 218 instructing that a first set of one or more light emitting elements 106 with specified locations emit light with certain lighting characteristics, such as color value, intensity value, or timing characteristics. Initialization module 318 retrieves data entries from light emitting element mapping database 335 corresponding to the specified locations. Based on the data entries, initialization module 318 determines the IDs corresponding to the specified locations. Initialization module 318 causes the first set of light emitting elements 106 corresponding to the IDs to emit light with the specified characteristics. After identification and location module 218 has verified that the location of each light emitting element 106 in the first set is correct, initialization module 318 receives a message from identification and location module 218 instructing that a second set of one or more light emitting elements 106 with specified locations emit light with certain lighting characteristics. Initialization module 318 causes the first set of light emitting elements 106 to stop emitting light. Initialization module 318 then causes the second set of light emitting elements 106 to emit light with the specified characteristics. The process continues until identification and location module 218 has verified the location of all light emitting elements 106 represented in light emitting element mapping database 335.

Operational module 319 is configured to cause light emitting elements 106 to emit light with certain patterns of varying color value, intensity value, and timing characteristics. Operational module 319 identifies locations of one or more light emitting elements 106 along with specified lighting characteristics corresponding to each location of the one or more light emitting elements 106. Operational module 319 accesses data entries in light emitting element mapping database 335 to determined corresponding IDs for each of the locations. Based on the IDs, operational module 319 then sends messages to cause each of the one or more light emitting elements 106 to emit light with the specified lighting characteristics. Operational module 319 continues this process to cause light emitting elements 106 to display the desired lighting effects with various color values, intensity values, and timing.

System disk 306 may include one or more hard disk drives, solid state storage devices, or similar storage devices. System disk 306 is configured to store non-volatile data such as light emitting element mapping database 335. Light emitting element mapping database 335 stores associations between ID and location for each light emitting element 106, as further described herein. In various embodiments, light emitting element mapping database 335 may be a copy of light emitting element mapping database 235, as illustrated in FIG. 2. In some embodiments, network interface 310 may be configured to operate in compliance with the Ethernet standard.

Identifying and Locating Wireless Light Emitting Elements

Figure 4:
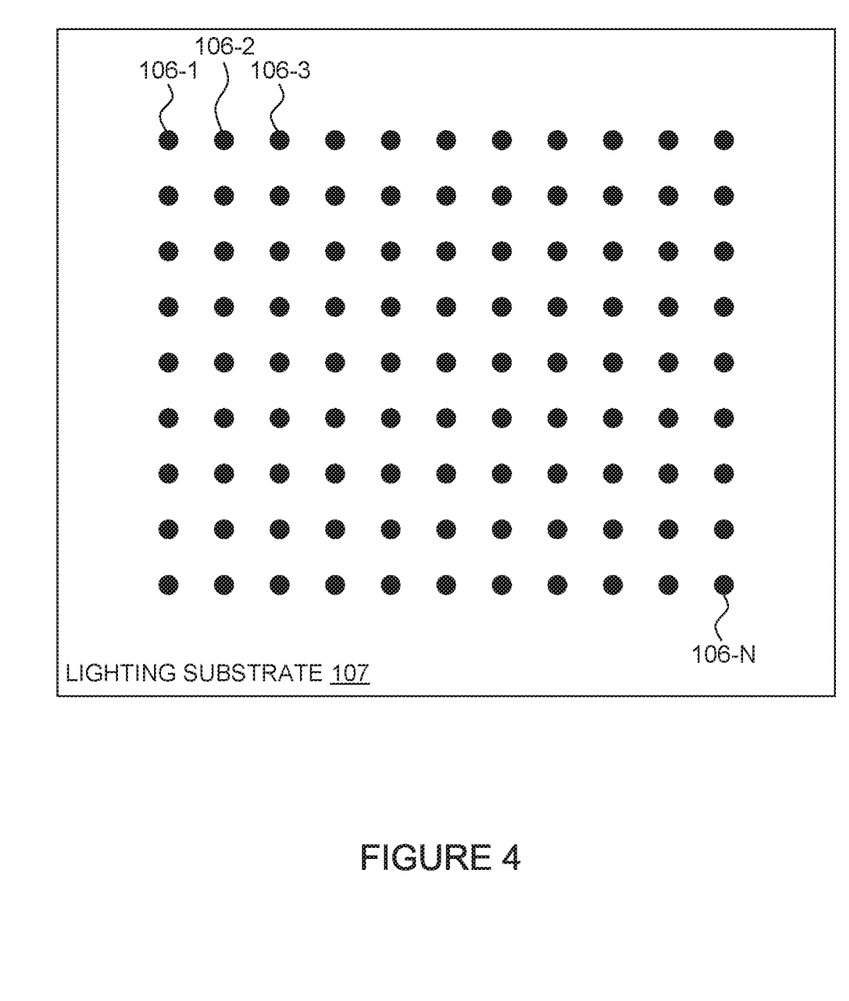
FIG. 4 is a more detailed illustration of the lighting substrate of FIG. 1, according to various embodiments.

FIG. 4 is a more detailed illustration of the lighting substrate 107 of FIG. 1, according to various embodiments. As shown, lighting substrate 107 includes, without limitation, light emitting elements 106-1, 106-2, 106-3, . . . 106-N arranged in a rectangular grid pattern. Each of light emitting elements 106-1, 106-2, 106-3, . . . 106-N is associated with a different ID. Light emitting elements 106-1, 106-2, 106-3, . . . 106-N communicate via a wireless communications channel. In operation, light emitting elements 106-1, 106-2, 106-3, . . . 106-N receive messages over the wireless communications channel and, in response, transmit messages over the wireless communications channel and/or emit light with specified lighting characteristics. If a light emitting element 106 receives a message with an instruction to return identification, then the light emitting element 106 transmits a message that includes the ID. If a light emitting element 106 receives a message that includes the ID corresponding to the particular light emitting element 106 to emit light, then the light emitting element 106 emits light with the color value, intensity value, timing, and/or other lighting characteristic specified by the received message.

Figure 5A:
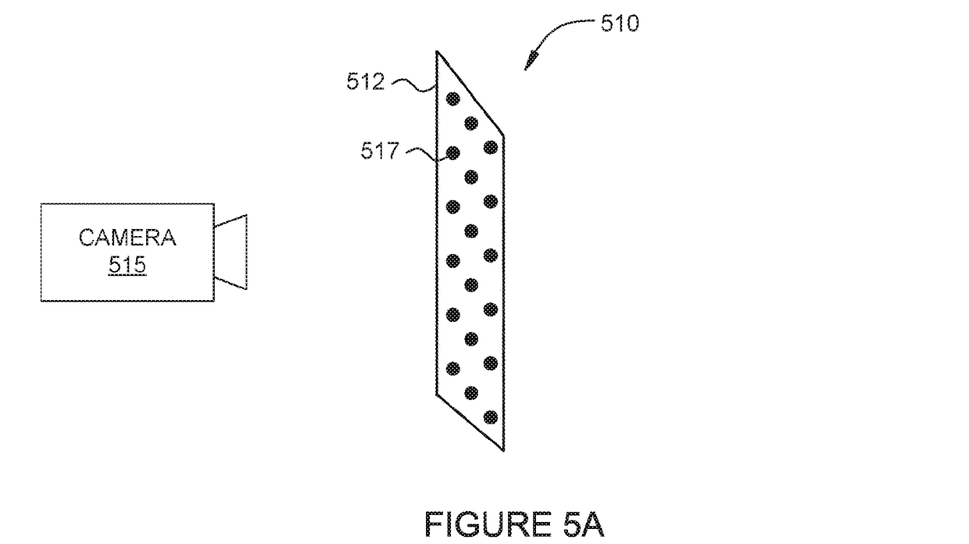
FIGS. 5A-5C are conceptual illustrations of how the system of FIG. 1 may be configured to calibrate light emitting elements placed on or embedded in different lighting substrate configurations, according to various embodiments.
Figure 5B:
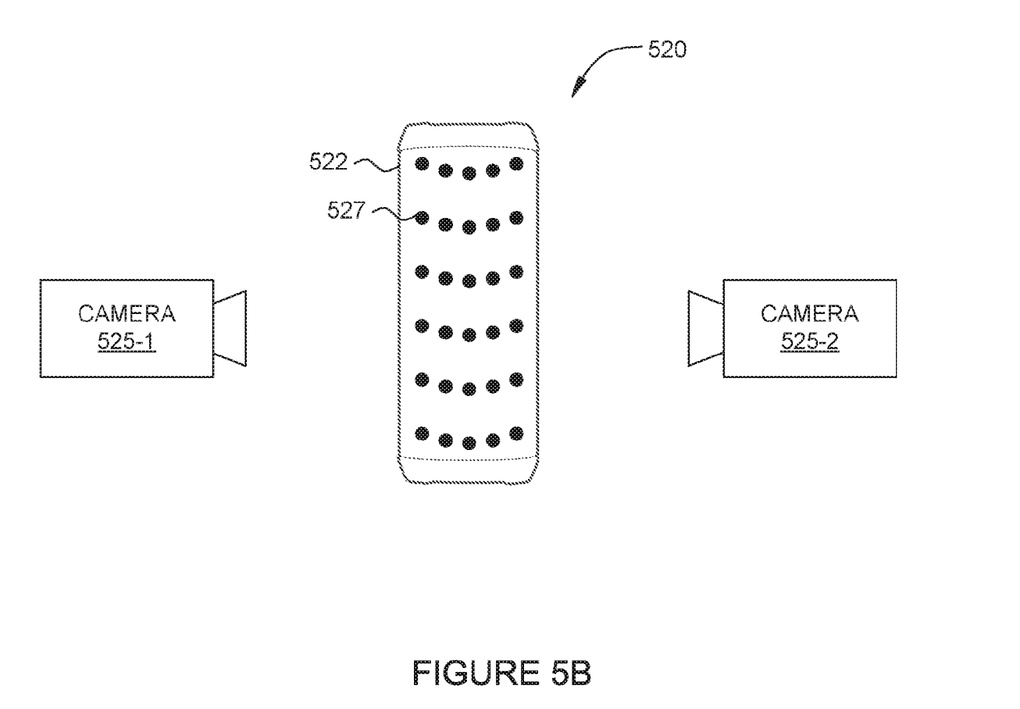
Figure 5C:
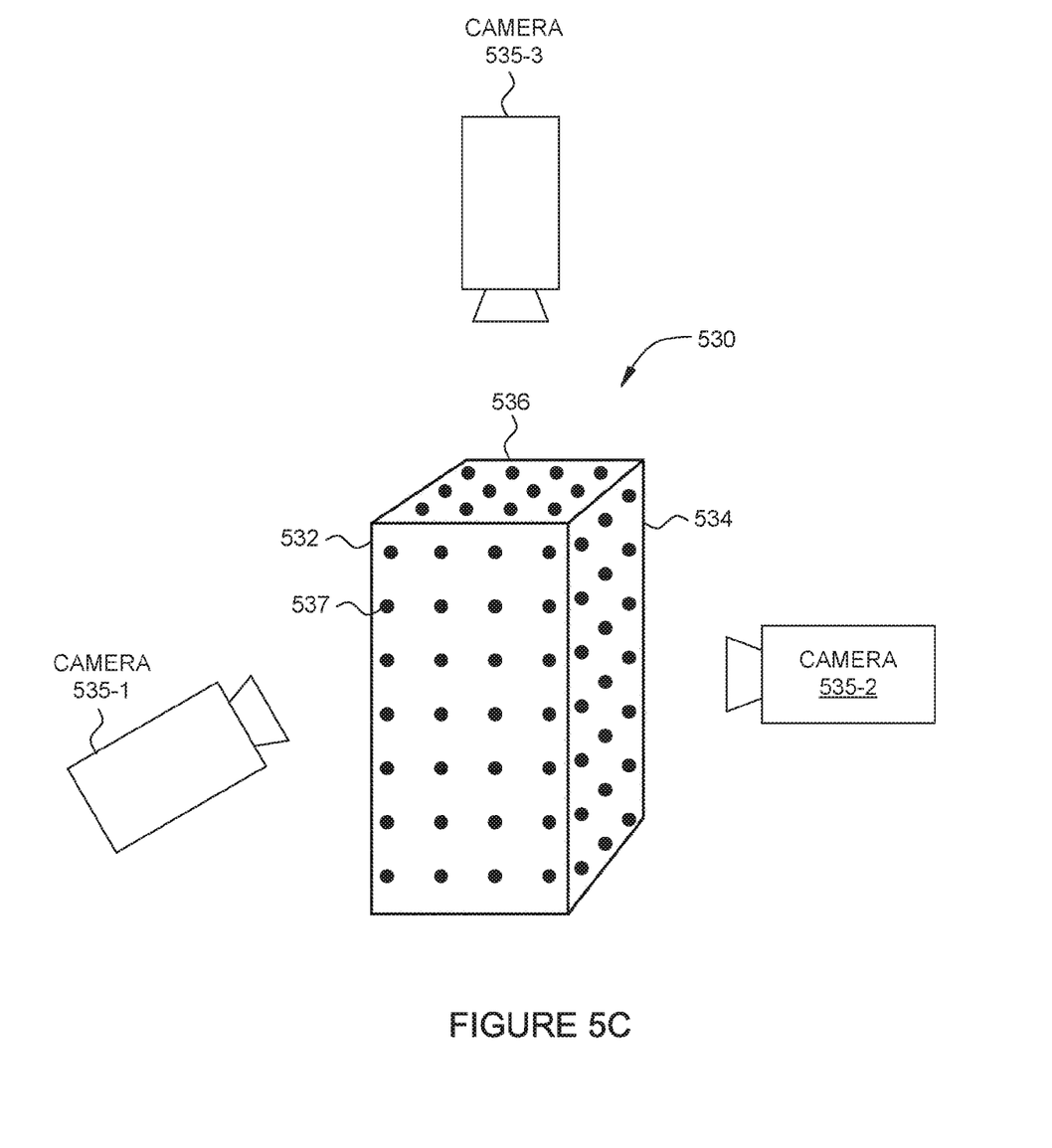

FIGS. 5A-5C are conceptual illustrations of how the system of FIG. 1 may be configured to calibrate light emitting elements placed on or embedded in different lighting substrate configurations, according to various embodiments. As shown in FIG. 5A, a camera 515 is directed at a lighting substrate 512 within lighting system 510. Lighting substrate 512 is in the form of a planar surface that includes multiple light emitting elements, such as light emitting element 517. Because the light emitting elements are arranged in a planar fashion, a single camera 515 is able to view all light emitting elements within lighting system 510. As shown in FIG. 5B, cameras 525-1 and 525-2 are directed at a lighting substrate 522 within lighting system 520. Lighting substrate 522 is in the form of a cylindrical surface that includes multiple light emitting elements, such as light emitting element 527. Because the light emitting elements are arranged in a cylindrical fashion, two cameras 525-1 and 525-2 are able to view all light emitting elements of lighting system 520. Additional cameras (not explicitly shown) may be deployed as needed in order to reliably view all light emitting elements within lighting system 520.

As shown in FIG. 5C, cameras 535-1, 535-2, and 535-3 are directed at lighting substrates 532, 534, and 536 within lighting system 530. Lighting substrates 532, 534, and 536 are placed onto the front, right side, and top, respectively, of a rectangular solid surface. In some embodiments, additional lighting substrates (not explicitly shown) may be placed onto one or more of the bottom, left side, and back of the rectangular solid surface. Each of lighting substrates 532, 534, and 536 includes multiple light emitting elements, such light emitting element 537. Because the light emitting elements are arranged onto a rectangular solid, three cameras 535-1, 535-2, and 535-3 are able to view all light emitting elements of lighting system 530. For example, and without limitation, camera 535-1 could be directed at lighting substrate 532, camera 535-2 could be directed at lighting substrate 534, and camera 535-3 could be directed at lighting substrate 536. Additional cameras (not explicitly shown) may be deployed as needed in order to reliably view all light emitting elements within lighting system 530.

Figure 6:
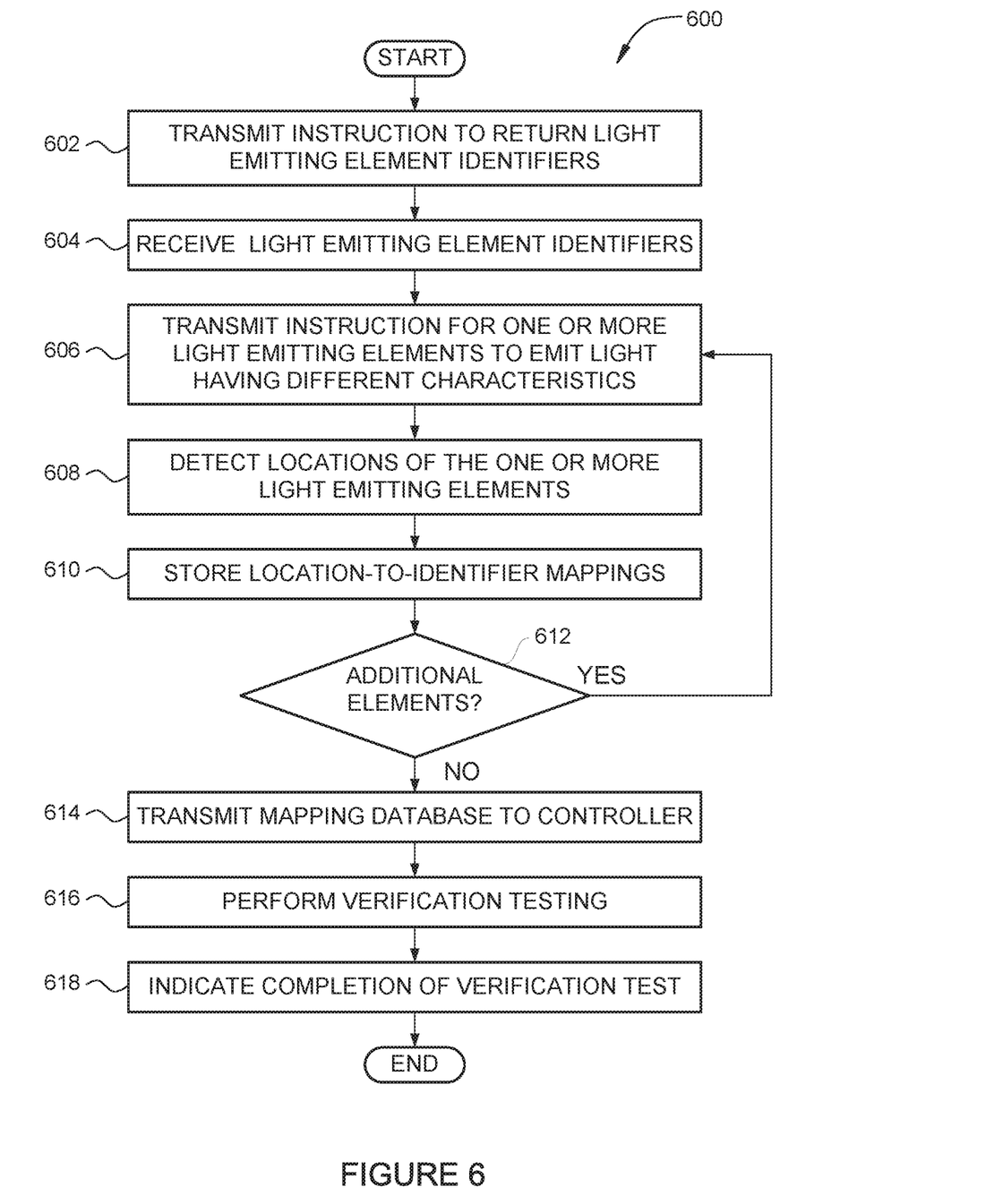
FIG. 6 is a flow diagram of method steps for identifying and localizing wireless light emitting elements that are placed on or embedded in a lighting substrate, according to various embodiments.

FIG. 6 is a flow diagram of method steps for identifying and localizing wireless light emitting elements that are placed on or embedded in a lighting substrate, according to various embodiments. Although the method steps are described in conjunction with the systems of FIGS. 1-5C, persons skilled in the art will understand that any system configured to perform the method steps, in any order, is within the scope of the disclosed embodiments.

As shown, a method 600 begins at step 602, where an identification and location module 218 executing on calibration system 102 transmits a message to instruct that identifiers (IDs) associated with a set of light emitting elements 106 included in a lighting system 104 be returned. In some embodiments, identification and location module 218 may transmit the message to a controller 108 within lighting system 104 that is executing an initialization module 318. In some embodiments, identification and location module 218 may transmit the message directly to light emitting elements 106. At step 604, identification and location module 218 receives the set of IDs either from controller 108 or directly from light emitting elements 106 and stores the received IDs in light emitting element mapping database 235.

At step 606, transmits a message to instruct that one or more light emitting elements 106 emit light with different lighting characteristics. In so doing, identification and location module 218 retrieves one or more IDs from light emitting element mapping database 235 and transmits a message directed to each light emitting element 106 corresponding to one of the retrieved IDs. Each message instructs a light emitting element corresponding to a particular ID to emit light with one or more specified lighting characteristics. In a first technique, identification and location module 218 transmits a message to instruct that a single light emitting element 106 emit light at a given color and intensity. In a second technique, identification and location module 218 transmits a message to instruct that each of the one or more light emitting elements 106 emit light at a unique frequency or color value. In a third technique, identification and location module 218 transmits a message to instruct that each of the one or more light emitting elements 106 emit light with certain timing characteristics. For example, and without limitation, identification and location module 218 could transmit a message to instruct that each of the one or more light emitting elements 106 emit light with different duty cycles, different strobe frequencies, or modulated with different data associated with the light emitting element 106, such as the corresponding ID.

At step 608, identification and location module 218 detects the locations of the one or more light emitting elements 106. Identification and location module 218 detects the locations based on images or other signals from cameras 110 and/or other photosensitive devices. Identification and location module 218 detects the locations further based on the position of lighting system 104 relative to each of the cameras 110 and/or other photosensitive devices. Depending on which of the techniques described herein are employed, identification and location module 218 may detect intensity, color, and/or timing characteristics of the light emitting elements 106 currently emitting light. In the first technique, identification and location module 218 determines the location of the light emitting element 106 currently emitting light. In the second technique, identification and location module 218 detects the frequency or color value of each light emitting element 106 currently emitting light and determines the location corresponding to each frequency or color value. In the third technique, identification and location module 218 analyzes the incoming images over a period of time to detect the timing pattern of each light emitting element 106 currently emitting light and determines the location corresponding to timing pattern.

At step 610, identification and location module 218 associates the detected locations with the corresponding IDs and stores the associations as data entries in light emitting element mapping database 235. At step 612, identification and location module 218 determines whether any additional light emitting elements 106 should be identified and located. If no additional light emitting elements 106 remain, then the method 600 proceeds to step 614, where identification and location module 218 transmits a copy of light emitting element mapping database 235 to controller 108. Controller 108, in turn, stores the copy in light emitting element mapping database 335.

At step 616, a testing module 219 executing on calibration system 102 performs a verification test. Testing module 219 transmits a message to instruct that one or more light emitting elements 106, corresponding to specific locations, emit light with different lighting characteristics. Via the techniques described herein, testing module 219 analyzes images received from cameras 110 and/or other photosensitive devices to verify that the one or more light emitting devices 106 are detected as being in the correct locations. At step 618, testing module 219 indicates that the verification test has completed, causing lighting system to stop executing initialization module 318 and begin executing operational module 319. The method 600 then terminates.

Returning to step 612, if additional light emitting elements 106 remain, then the method 600 proceeds to step 606, described above.

In sum, a calibration system is fitted with one or more photosensitive devices, such as a camera. The calibration system is configured to identify and locate wireless light emitting elements mounted on one or more lighting substrates associated with a lighting system. The light emitting elements are arranged in any desired 1D, 2D, or 3D configuration. The calibration system receives a set of identifiers (IDs), where each of the light emitting elements is associated with a different ID. The calibration system causes one or more light emitting elements to emit light with specified lighting characteristics. Based on the images received by the cameras, the calibration system associates the location of each of the one or more light emitting elements with the corresponding IDs. The calibration system stores the associations as data entries in a database. After the calibration system identifies and locates all light emitting elements, the calibration system transmits the database to the lighting system. The calibration system and the lighting system then perform verification testing to verify the location of each light emitting element. After completion of verification testing, the lighting system is configured to cause the light emitting elements to display patterns of color, intensity and timing based on the associations stored in the data entries of the database.

At least one advantage of the approach described herein is that wireless light emitting elements are automatically identified and located during post assembly testing, thereby reducing labor costs associated with manually presorting or recording IDs of the light emitting elements. The reduction in labor costs may result in lower total product cost and/or an increase in the quantity of wireless light emitting elements that may be deployed for a given target product cost. As a result, profit margin may increase, end-user price may decrease, and/or more sophisticated lighting displays may be achievable without increasing end-user price. Another advantage of the disclosed approach is that field service and refurbishing costs may be reduced if the disclosed techniques are employed in conjunction with replacing one or more lighting emitting elements after initial product shipment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for identifying and locating wireless light emitting elements within a lighting system, the method comprising:
   transmitting, via a wireless connection, one or more first messages to instruct a plurality of light emitting elements within the lighting system to return a plurality of identifiers;
   receiving, via the wireless connection, a first identifier included in the plurality of identifiers from a first light emitting element included in the plurality of light emitting elements;
   transmitting, via the wireless connection, a second message to instruct the first light emitting element to emit light having a first characteristic;
   detecting, via a photosensitive device, a first location of the first light emitting element within the lighting system based on the first characteristic; and storing a first data entry in a memory that associates the first location with the first light emitting element.

2. The computer-implemented method of claim 1, further comprising transmitting a third message to instruct a second light emitting element included in the plurality of light emitting elements within the lighting system to emit light having a second characteristic.

3. The computer-implemented method of claim 2, further comprising:
  detecting, via the photosensitive device, a second location of the second light emitting element within the lighting system based on the second characteristic; and
  storing a second data entry in the memory that associates the second location with the second light emitting element.

4. The computer-implemented method of claim 2, wherein the second light emitting element emits light having the second characteristic concurrently with the first light emitting element emitting light having the first characteristic.

5. The computer-implemented method of claim 2, wherein the first characteristic comprises a first color value and the second characteristic comprises a second color value.

6. The computer-implemented method of claim 2, wherein the first characteristic comprises a first intensity modulation frequency and the second characteristic comprises a second intensity modulation frequency.

7. The computer-implemented method of claim 2, wherein the first characteristic comprises a first timing pattern that represents an encoding of a first identifier associated with the first light emitting element and the second characteristic comprises a second timing pattern that represents an encoding of a second identifier associated with the second light emitting element.

8. The computer-implemented method of claim 2, further comprising:
  transmitting a message to instruct the first light emitting element to emit light having the second characteristic; and
  verifying, via a photosensitive device, the first location of the first light emitting element based on the second characteristic.

9. A non-transitory computer-readable storage medium including instructions that, when executed by a processor, configure the processor to perform the steps of:
  transmitting, via a wireless connection, one or more first messages to instruct a plurality of light emitting elements within the lighting system to return a plurality of identifiers;
  receiving, via the wireless connection, a first identifier included in the plurality of identifiers from a first light emitting element included in the plurality of light emitting elements;
  transmitting, via the wireless connection, a second to the first light emitting element to instruct the first light emitting element to emit light having a first characteristic;
  detecting, via a photosensitive device, a first location of the first light emitting element within the lighting system based on the first characteristic; and
  storing a data entry in a memory that associates the first location with the first light emitting element.

10. The non-transitory computer-readable storage medium of claim 9, wherein the first characteristic comprises at least one of a color value and an intensity modulation frequency.

11. The non-transitory computer-readable storage medium of claim 9, wherein the first characteristic comprises a timing pattern associated with a duty cycle.

12. The non-transitory computer-readable storage medium of claim 9, wherein the first characteristic comprises a timing pattern associated with a strobe frequency.

13. The non-transitory computer-readable storage medium of claim 9, wherein the first characteristic comprises a timing pattern that represents an encoding of the first identifier.

14. The non-transitory computer-readable storage medium of claim 9, wherein the first characteristic comprises a timing pattern associated with at least one of pulse-code modulation, quadrature amplitude modulation, and pulse width modulation.

15. A computing device, comprising:
  a memory that includes an calibration application; and
  a processor that is coupled to the memory and, when executing the calibration application, is configured to:
    transmit, via a wireless connection, one or more first messages to instruct a plurality of light emitting elements within the lighting system to return a plurality of identifiers;
    receive, via the wireless connection, a first identifier included in the plurality of identifiers from a first light emitting element included in the plurality of light emitting elements;
    transmit, via the wireless connection, a second to a controller instructing that the first light emitting element emit light having a first characteristic;
    detect, via a photosensitive device, a first location of the first light emitting element within the lighting system based on the first characteristic; and
    store a data entry in a memory that associates the first location with the first light emitting element.

16. The computing device of claim 15, wherein the photosensitive device comprises at least one of a photosensor and a camera.

17. The computing device of claim 15, wherein the first light emitting element comprises a wireless light emitting diode.

18. The computing device of claim 15, wherein the controller communicates with the first light emitting device via a first wireless communications channel, and the controller communicates with the computing device via a second wireless communications channel.

* * * * *